(12) United States Patent
Skans et al.

(10) Patent No.: US 10,373,035 B2
(45) Date of Patent: Aug. 6, 2019

(54) METHOD AND SYSTEM FOR DETERMINING SPATIAL CHARACTERISTICS OF A CAMERA

(71) Applicant: Axis AB, Lund (SE)

(72) Inventors: Markus Skans, Staffanstorp (SE); Björn Ardö, Lund (SE); Igor Gurovski, Bunkeflostrand (SE)

(73) Assignee: Axis AB, Lund (SE)

( * ) Notice: Subject to any disclaimer, the term of this patent is extended or adjusted under 35 U.S.C. 154(b) by 146 days.

(21) Appl. No.: 15/157,096

(22) Filed: May 17, 2016

(65) Prior Publication Data

US 2016/0343137 A1 Nov. 24, 2016

(30) Foreign Application Priority Data

May 19, 2015 (EP) .................................... 15168222

(51) Int. Cl.
*G06K 19/06* (2006.01)
*G06K 7/10* (2006.01)
(Continued)

(52) U.S. Cl.
CPC ....... *G06K 19/0614* (2013.01); *G06K 7/1095* (2013.01); *G06K 7/10722* (2013.01);
(Continued)

(58) Field of Classification Search
None
See application file for complete search history.

(56) References Cited

U.S. PATENT DOCUMENTS

| 7,543,748 B2 | 6/2009 | Kiliccote |
| 7,905,411 B2 | 3/2011 | Ibe |

(Continued)

FOREIGN PATENT DOCUMENTS

| CN | 101667256 A | 3/2013 |
| CN | 103280153 A | 9/2013 |

(Continued)

OTHER PUBLICATIONS

"Visual Communication Using LED Panel and Video Camera for Mobile Object"; Hiroyuki Ukida et al.; Imaging Systems and Techniques (1st), 2012 IEEE International Conference on, IEEE, (Jul. 16, 2012), pp. 321-326, XP032237222.

(Continued)

*Primary Examiner* — William C Vaughn, Jr.
*Assistant Examiner* — Stuart D Bennett
(74) *Attorney, Agent, or Firm* — Volpe and Koenig, P.C.

(57) ABSTRACT

A method and system for determining a position of a camera is disclosed. The method and system includes determining and registering geographical coordinates of a mobile device in the mobile device itself, presenting on a display of the mobile device a pattern representing the geographical coordinates of the mobile device, capturing by the camera an image of the display of the mobile device when presenting the geographical coordinates, translating in the camera the pattern in the captured image of the display of the mobile device into geographical coordinates, and determining in the camera the position of the camera based on the geographical coordinates translated from the pattern in the captured image.

13 Claims, 6 Drawing Sheets

(51) Int. Cl.
*H04N 7/18* (2006.01)
*G06T 7/80* (2017.01)
*G06T 7/73* (2017.01)
*H04M 1/725* (2006.01)
*H04W 4/02* (2018.01)

(52) U.S. Cl.
CPC ............... *G06T 7/74* (2017.01); *G06T 7/80* (2017.01); *H04M 1/72522* (2013.01); *H04N 7/181* (2013.01); *H04W 4/025* (2013.01); *G06K 19/06028* (2013.01); *G06K 19/06037* (2013.01); *G06T 2207/30232* (2013.01); *G06T 2207/30244* (2013.01)

(56) References Cited

U.S. PATENT DOCUMENTS

| | | | |
|---|---|---|---|
| 9,015,806 B2 | 4/2015 | Song | |
| 2008/0084473 A1 | 4/2008 | Romanowich | |
| 2009/0045259 A1 | 2/2009 | Ehrhart et al. | |
| 2009/0228694 A1 | 9/2009 | Karstens | |
| 2010/0110212 A1* | 5/2010 | Kuwahara | H04N 5/232 348/222.1 |
| 2010/0259549 A1 | 10/2010 | Brown et al. | |
| 2011/0085732 A1* | 4/2011 | Cheng | G06K 7/14 382/182 |
| 2011/0134256 A1* | 6/2011 | Moribe | H04N 7/181 348/207.1 |
| 2012/0127319 A1* | 5/2012 | Rao | H04N 5/23206 348/169 |
| 2013/0157760 A1 | 6/2013 | Boudville | |
| 2013/0240627 A1 | 9/2013 | Mamaladze et al. | |
| 2013/0271604 A1 | 10/2013 | Follesa et al. | |
| 2013/0343645 A1 | 12/2013 | Dalal et al. | |
| 2014/0043209 A1 | 2/2014 | Walker et al. | |
| 2014/0211018 A1* | 7/2014 | de Lima | H04N 7/181 348/159 |
| 2015/0198447 A1* | 7/2015 | Chen | G01S 5/0252 701/472 |
| 2016/0055848 A1* | 2/2016 | Meruva | G10L 15/22 704/275 |

FOREIGN PATENT DOCUMENTS

| | | |
|---|---|---|
| EP | 1 655 947 A1 | 5/2006 |
| EP | 2 290 576 A1 | 3/2011 |
| GB | 2471567 A1 | 1/2011 |
| JP | 10-285585 A | 10/1998 |
| JP | 2003-324713 A | 11/2003 |
| JP | 2013-145996 A | 7/2013 |
| JP | 2014235676 A2 | 12/2014 |
| KR | 10-2006-0037807 A | 5/2006 |
| WO | 2010/097618 A1 | 9/2010 |
| WO | 15017802 A1 | 2/2015 |

OTHER PUBLICATIONS

QR-GPS Plugin; Google internet search (2014).
Zmodo 720P HD Wireless Indoor Network IP Camera; ZH-1XA15-WC; product overview, internet search (2013).
Camera Pose Estimation Using QR codes in MATLAB; Jonathan Brian, Stack Overlfow question and answer blog; (Nov. 24, 2013).
Setting up the Logitech Broadcaster Wi-Fi webcam using the QR Code with the iPad and iPhone; logitech-en-amr.custhelp.cm/app/answers/detail; internet search (Nov. 6, 2013).
EP 15 16 8222.6 European Search Report (dated Nov. 25, 2015).

* cited by examiner

METHOD AND SYSTEM FOR DETERMINING SPATIAL CHARACTERISTICS OF A CAMERA

FIELD OF INVENTION

A method and a system for determining spatial characteristics of a camera and in particular the spatial position of a camera is disclosed.

BACKGROUND

Video cameras capturing motion video imagery are commonly used in monitoring and/or surveillance. Typically, a network of cameras are arranged in order to cover a predetermined area. The video data captured may be recorded, viewed in real time, automatically analysed etc.

Mapping surveillance cameras and/or monitoring cameras onto a map showing a surveyed/monitored area is very useful for many applications. For example the map may be used to locate specific cameras for repair or simply to locate where a particular incident being captured on video really occurred. Moreover, the camera on the map may be paired with video streams originating from the specific camera in order to facilitate selection of a video stream related to the area in the map. The position data of the camera may also be recorded in the video in order to enable identification of where the video was captured.

This type of mapping may of course be performed manually by having a person checking where all the cameras are positioned and enter them onto a paper map or a digital map. The geographic positioning within the digital map may be performed by simply selecting a position in a map showed on a display or by entering coordinates representing the position of the camera. These coordinates may be given in any geographic coordinate system as long as the position is uniquely identified.

Manually identifying the positions of cameras may be laborious, tedious, and prone to errors. This is particularly true in large surveillance and/or monitoring systems including many cameras. However, methods for identifying the position of cameras in such systems have been developed in order to overcome these concerns. For example there are implementations in which each camera is provided with satellite navigation circuitry, e.g., GPS, GLONASS, Galileo, etc., and transmits its coordinates to a central server where the position is registered and indicated on a map. The geographic position may also or alternatively be inserted into the video stream, sometimes referred to as geo-tagging.

Another method for facilitating the collecting of the geographic position of the cameras in a camera network is described in the international patent application WO 2014/013015. The patent application describes a vehicle equipped with navigation equipment enabled to determine the geographic position of the vehicle. Further, the vehicle carries an optically recognizable structure, e.g., a checkerboard, light emitting equipment, texture with differentiable colour segments, and an optical transmitter arranged to transmit a unique identifier that is changing over time. Then, the vehicle is driven on streets within a surveyed area and continuously registering the position of the vehicle. The registered position is associated with the continuously changing identifier sent via the optical transmitter and both are sent to a computer system. Video cameras in the surveyed area are capturing images of the vehicle and send them to the computer system where the unique identifier is recognised in the images including the vehicle and each picture including the vehicle may be matched to a position registered by the navigation equipment in the vehicle. Then characteristics of a camera relating to position and direction may be calculated based on the position of the vehicle when the camera captured images of it and based on the location within the image for the vehicle.

This system facilitates the identification, collecting, and registration of geographical position of cameras in a surveillance and/or monitoring system. However, the system is still complex and requires a lot of fairly advanced hardware and post processing in order to yield adequate results.

SUMMARY

One object of the disclosure is to facilitate determining of the position of a camera.

In particular, according to at least one embodiment, the method for determining a position of a camera comprises determining and registering geographical coordinates of a mobile device in the mobile device itself, presenting on a display of the mobile device a pattern representing the geographical coordinates of the mobile device, capturing by the camera an image of the display of the mobile device when presenting the geographical coordinates, translating in the camera the pattern in the captured image of the display of the mobile device into geographical coordinates, and determining in the camera the position of the camera based on the geographical coordinates translated from the pattern in the captured image. One advantage of using the display of the mobile device and the image sensor of the camera to provide and receive, respectively, spatial information such as the position of the mobile device is that the process of determining the position of the camera will be simple for the user. Moreover, the process may be performed using existing hardware, i.e. no re-designs are necessary, and synchronizing problems due to pairing of data from different devices may be avoided.

The method may further comprise the act of presenting on the display of the mobile device a pattern representing a value identifying a distance between two distinguishable features of the pattern presented on the display of the mobile device. One advantage of this may be that the device analysing the image, e.g., the camera, is presented with knowledge of the real world size of the pattern displayed and may thus use the pattern in calculating various properties of the camera and the mobile device. For instance the information may be used in increasing the precision in calculating the position of the camera.

Moreover, the method may further comprise the act of presenting on the display of the mobile device a pattern representing a geographical direction in which the mobile device is directed. By providing the direction of the mobile device the determination of the viewing direction of the camera may be facilitated.

The pattern may be a two dimensional code and this pattern may represent said data that is to be represented by a pattern on the display of the mobile device. In some embodiments the pattern is a QR-code.

Further, the act of determining the position of the camera may include calculating the position of the camera by adjusting the position retrieved from the pattern presented by the mobile device based at least on physical features of the pattern which may be measured in the captured image, on the value identifying the distance between two distinguishable features in the pattern of the captured image, and on the geographic direction of the mobile device. By performing these steps the position of the camera may, in some cases, be determined with higher precision than would be possible otherwise.

In some embodiments the act of determining the position of the camera includes the act of determining the position of the camera as the position presented by the mobile device. One advantage of this scheme is that it is simple to implement as it mainly requires the system to interpret the information in the code presented by the mobile device. Hence, no need for complex calculations.

Further, the method may further comprise storing the position of the camera in the camera. Alternatively, the position of the camera may be stored in a camera managing server.

A system for determining spatial characteristics of a camera is also disclosed. The system comprises the camera and a mobile device. The mobile device comprises a positioning sensor, a pattern generator arranged to generate a pattern representing a position detected by the positioning sensor, and a display arranged to visually present said pattern. The camera comprises an image sensor for capturing images of a scene, a pattern interpreter arranged to interpret the information in the pattern generated by the pattern generator of the mobile device and captured by the image sensor, a position extractor arranged to extract the position information from the interpretation by the pattern interpreter, and a camera position setter arranged to set the position of the camera based on the position extracted by the position extractor. One advantage of using the display of the mobile device and the image sensor of the camera to provide and receive, respectively, spatial information such as the position of the mobile device is that the process of determining the position of the camera will be simple for the user. Moreover, the process may be performed using existing hardware, i.e. no re-designs are necessary, and synchronizing problems due to pairing of data from different devices may be avoided.

In some embodiments of system the pattern generator is arranged to generate a pattern comprising information identifying a distance between two distinguishable features of the pattern presented on the display of the mobile device. One advantage of this may be that the device analysing the image, e.g., the camera, is presented with knowledge of the real world size of the pattern displayed and may thus use the pattern in calculating various properties of the camera and the mobile device. For instance the information may be used in increasing the precision in calculating the position of the camera.

The mobile device of the system may further comprise a direction sensor arranged to detect the direction in which the mobile device is directed and the pattern generator may be arranged to generate a pattern comprising information identifying such detected direction. By providing the direction of the mobile device the determination of the viewing direction of the camera may be facilitated. The mobile device of the system may be a smart phone or a tablet computer.

According to some embodiments the camera position setter comprises a position calculator arranged to calculate the position of the camera based on the image of the pattern, on the information of the distance between two distinguished features of the pattern, on the direction of the mobile device, and on the position of the mobile device. The advantage of such position calculator is that the position of the camera may, in some cases, be determined with higher precision than would be possible otherwise.

According to some embodiments the camera position setter is arranged to set the position of the camera to the same position as the position presented in the pattern displayed by the mobile device. Such embodiments are simple to implement as they mainly require the system to interpret the information in the code presented by the mobile device. Hence, no need for complex calculations for calculating the position.

A further scope of applicability of the disclosure will become apparent from the detailed description given below. However, it should be understood that the detailed description and specific examples, while indicating embodiments of the disclosure, are given by way of illustration only, since various changes and modifications within the scope of the disclosure will become apparent to those skilled in the art from this detailed description. Hence, it is to be understood that this disclosure is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

A more detailed understanding may be had from the following description, given by way of example in conjunction with the accompanying drawings wherein.

Further, in the figures like reference characters designate like or corresponding parts throughout the several figures.

DETAILED DESCRIPTION

The present disclosure relates to processes and systems for determining a position of a stationary surveillance and/or monitoring camera. The camera is stationary in the sense that it is not mobile, i.e. it is not moving from one location to another on a regular basis. The camera may, however, very well be a PTZ camera, i.e. a camera that is enabled to pan and tilt.

Figure 1:
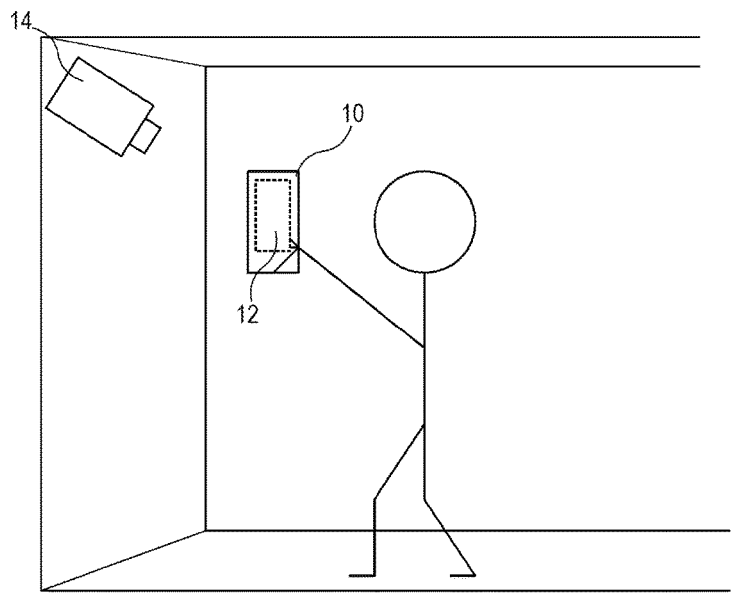
FIG. 1 is a schematic image of the system for determining spatial characteristics of a camera in use according to one embodiment.

According to one embodiment, see FIG. 1, a mobile device 10 having a display 12 is operated to generate a QR-code including at least information indicating the geographic position of the mobile device 10. Other graphical codes than QR-codes may of course be used, e.g., any two dimensional graphic code, any one dimensional graphic code, plain text, etc., but the QR-code will be used in the examples throughout the rest of the description in order to facilitate the understanding. Alternatively may temporal encoding, e.g., information being transferred using variation in luminance in one or a plurality of positions on a display, be used. However, a temporal encoding may not exhibit all advantages related to some of the two dimensional graphical codes. A mobile device may be a mobile telephone, a portable GPS, a tablet computer, or any other device having a display and the necessary functional components, which differ between embodiments and will all be described below. The QR-code is displayed on the display 12 of the mobile device 10 and the display of the mobile device 10 is showed to a monitoring camera 14 in the monitoring system, i.e. the display of the mobile device is temporarily arranged facing the optical input, e.g., lens, of the monitoring camera in order for the camera to capture and detect the image of the QR-code presented on the display of the mobile device. Then the QR-code is decoded and the monitoring camera is tagged with the position information given in the code, i.e. the geographical position information is stored in the camera and identified as the position of the camera or stored at a central server where it is stored as the position of this particular camera.

Figure 2:
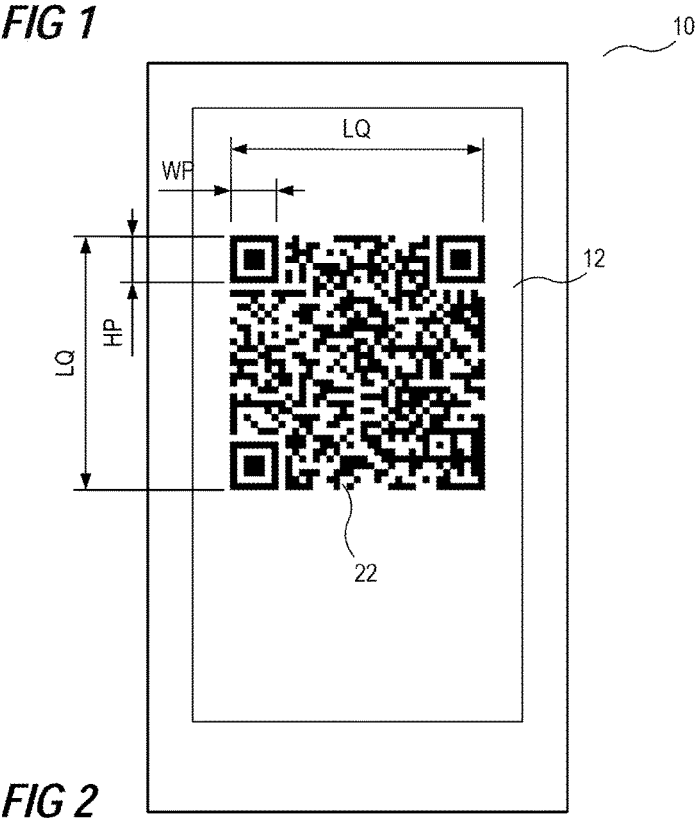
FIG. 2 is an example of a mobile device displaying a QR-code and highlighting some features of the QR-code which may be used in an embodiment.

In FIG. 2 an example of a QR-code 22 presented on the display 12 of the mobile device 10 is showed, the QR-code 22 in the figure is not carrying the information but is rather an example included for explaining some additional parameters that the QR-code 22 may relay to the monitoring camera 14 and/or the monitoring system. In one embodiment the QR-code 22 may in addition to the position include display specific spatial information of the QR-code 22. This display specific spatial information may relate to a real size or a real distance of the QR-code 22 as presented on the display 12. For example, the display specific spatial information may represent the distance LQ between two corners of the QR-code 22, it may represent the width WP or height HP of a position indicator P in the QR-code 22. This display specific spatial information may be used by the monitoring camera 14 or the system to calculate a distance between the monitoring camera 14 and the mobile device 10. This calculated distance may then be utilised in order to adjust the geographic position of the mobile device 10, which is received in the monitoring camera, to more closely correspond to the real geographic position of the monitoring camera 14. Display specific spatial information may be used for even more adjustments and calculations which will be discussed below.

Further, the QR-code 22 may include information relating to the horizontal direction the mobile device 10 is facing. The direction may be given in degrees in relation to north, as used in a compass, and this horizontal direction may be generated by an electronic compass included in the mobile device 10. The horizontal direction may be seen as the pan angle or direction of the monitoring camera 14. In addition, the QR-code 22 may include information relating to the vertical direction, i.e. tilt angle, in which the mobile device 10 is facing. This tilt angle may be generated by a tilt sensor in the mobile device 10.

The pan and/or tilt directions presented by the mobile device 10 may be assumed to approximate the actual pan and/or tilt directions of the monitoring camera, especially if the display 12 of the mobile device 10 is held substantially in a plane orthogonal to the optical axis of the monitoring camera 14. If this is the case, then the back of the mobile device 10 is arranged facing in the same direction as the monitoring camera 14. To facilitate for the user to hold the display 12 of the mobile device 10 substantially orthogonal to the display the monitoring camera 14 may detect the pattern on the display 12 of the mobile device 10 and check if straight lines in a pattern presented on the display 12 are captured as substantially straight lines or if graphical features having the same size presented on the display 12 really is captured as features of the same size. When the monitoring camera 14 identifies that the display 12 of the mobile device 10 is substantially orthogonal to the optical axis, the monitoring camera 14 may sound a signal or have a light source emit light. The QR-code 22 or any other code used may be used as this type of reference pattern. Further, the QR-code 22 may be frequently changed in order to include the changing directions of mobile device 10 in order to enable the monitoring camera 14 to capture the true direction when the pattern of the QR-code 22 is lined up correctly.

Alternatively the monitoring camera 14 captures the pattern representing the QR-code 22 and then calculates deviations between the optical axis and the directions given in the QR-code 22. The calculation may be based on perspective distortions of the pattern captured by the monitoring camera 14. Examples of such calculations will be presented below.

In another embodiment the QR-code 22 may include an angle of roll. In the description of the present application the angle of roll should be interpreted as the angle through which mobile device 10 must be rotated about an axis orthogonal to the display 12 to bring the bottom or top display edge into a horizontal plane, i.e. the horizontal plane of the real world. For the monitoring camera 14 the angle of roll is defined similar as the angle through which the monitoring camera 14 must be rotated about its optical axis to bring the bottom or top edge of the captured image into a horizontal plane, i.e. the horizontal plane of the real world. The angle of roll of the mobile device 10 may be detected by an accelerometer, in some embodiments in combination with a gyro, and be presented in the QR-code 22 on the display 12. This information may then be used by the monitoring camera 14 to calculate its angle of roll.

Moreover, in one embodiment the QR-code 22 includes a cryptographic code authenticating the mobile device 10 as a mobile device 10 authorised to provide position data and possibly other applicable data to the monitoring camera 14 and the monitoring system. The cryptographic code may be implemented using public key encryption, symmetric key encryption, or any other category of cryptography. There are a plurality of well-known implementations in various categories of cryptography.

Initiation of transfer of position data and possibly other data via the QR-code 22 is achieved by having the monitoring camera 14 frequently run a QR-code 22 detection process. In this way the monitoring camera 14 is always prepared to receive coordinates and other data via a QR-code 22. One drawback may be that system resources will be wasted for a long time period when there is no QR-code 22 to identify. Hence, this method would probably be used in a system where QR-codes are used for other purposes as well and wherein the use of QR-codes for these other purposes are performed at such high frequency that the use of the system resources for running QR-code detection processes frequently may be affordable. The frequency of running the processes for detecting QR-codes may vary depending on the application. However a person should not be required to wait more than thirty seconds for detection. When the monitoring camera 14 has detected a QR-code some indicator on the monitoring camera 14, sound or light, should inform the person controlling the mobile device 10 that the QR-code 22 is detected and the processing of it has begun or is finished.

Alternatively, a QR-code detection period is initiated by a signal over the network from a device authorised to control the monitoring network. The system could be arranged to make all or a subset of the monitoring cameras 14 in the monitoring system run the QR-detection process at predetermined intervals during the period. The process may be run as often that a user displaying the mobile device to a monitoring camera 14 would not notice any annoying latency before the code is detected. The QR-code detection period, during which the detection process is run frequently, may be set to a specific length, e.g., an hour or thirty minutes, all depending on the extension of the monitoring system. Alternatively, the QR-code detection period may be manually ended by sending a signal from the same device authorised to control the monitoring network or from another device also being authorised.

The information provided to the monitoring camera 14 according to any of the above embodiments may be used by the monitoring camera 14 or by the monitoring system for many purposes. For instance, the positional and directional information may be used to correctly position monitoring cameras 14 on a map or a building plan. The position may be used to draw the monitoring camera 14 at the right position. The pan direction may be used to draw an indication of the area monitored by the monitoring camera 14; the calculation of this area may be refined by considering the focal length used by the camera.

The angle of roll of the monitoring camera 14 and the tilt angle of the monitoring camera 14 may be used to electronically adjust the captured imagery in order to remove slanted horizontal lines and perspective distortions.

Moreover, the position and the pan direction of the monitoring camera 14 may be used in the monitoring system to facilitate handover of tracked objects between monitoring cameras 14 or to identify non monitored areas.

Figure 3:
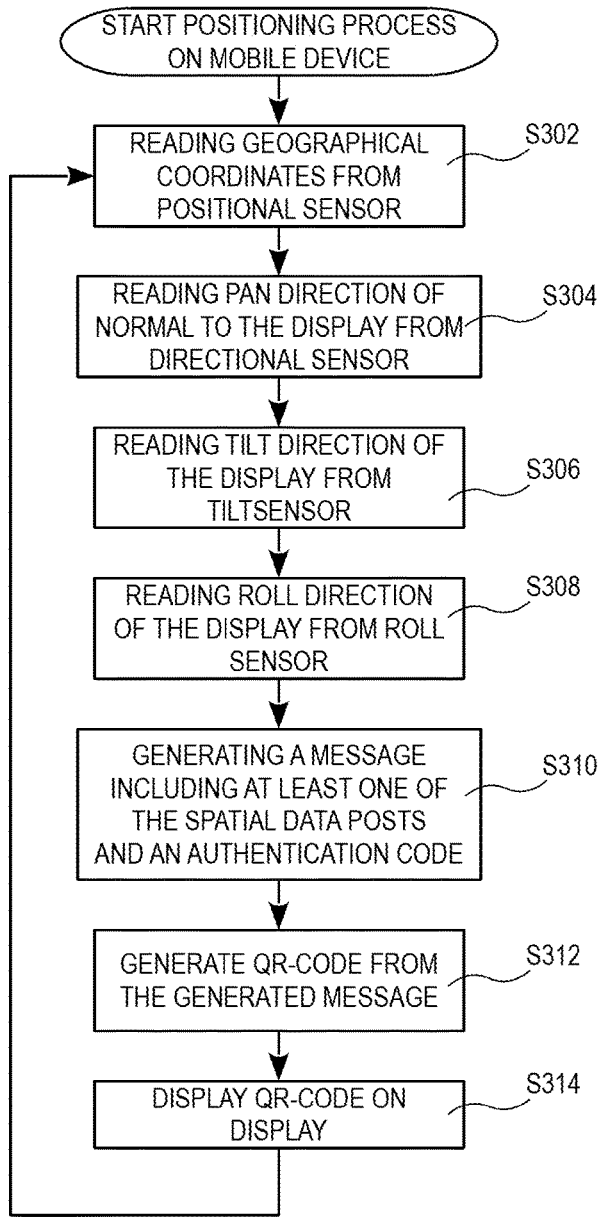
FIG. 3 is a flowchart depicting a process performed by the mobile device according to one embodiment.

According to one embodiment, the process for determining a position of a monitoring camera 14 includes a person or a vehicle being equipped with a mobile device 10 and the display 12 of the mobile device 10 being directed towards the monitoring camera 14. When the mobile device 10 is in position for having its display 12 captured by the monitoring camera 14, the process described below with reference to FIGS. 3 and 4, respectively presents an example for the determining of the position of the monitoring camera 14. Now referring to FIG. 3, the mobile device 10 is reading geographical coordinates from a position sensor, S302. This reading of geographical coordinates may be performed by the mobile device 10 continuously since the device 10 has been switched on, it may start in response to a user of the device 10 starting an application including the process, and it may be started in connection with the mobile device 10 being used in determining the position of a monitoring camera 14. If available, which is not the case for all embodiments, the direction in which the display 12 or the back of the mobile device 10 is directed is read from a directional sensor, S304, a tilt direction is read from a tilt sensor, S306, and a roll direction is read from a roll sensor, S308. The data used for the tilt direction and the roll direction may be read from the same sensor. Then a message including at least one post of the data read from the sensors is generated, S310, in the mobile device 10. A predetermined authentication code stored in the mobile device 10 or an authentication code keyed in by the user is also included in the message. Further, display specific spatial information, as discussed in connection with FIG. 2, may also be included in the message. When the message has been generated it is encoded into a QR-code 22, S312, which then is displayed on the display 12 of the mobile device 10, S314. This process then returns to S302 in order to read new sensor data in order to display a new QR-code 22 including possibly updated sensor data.

Figure 4:
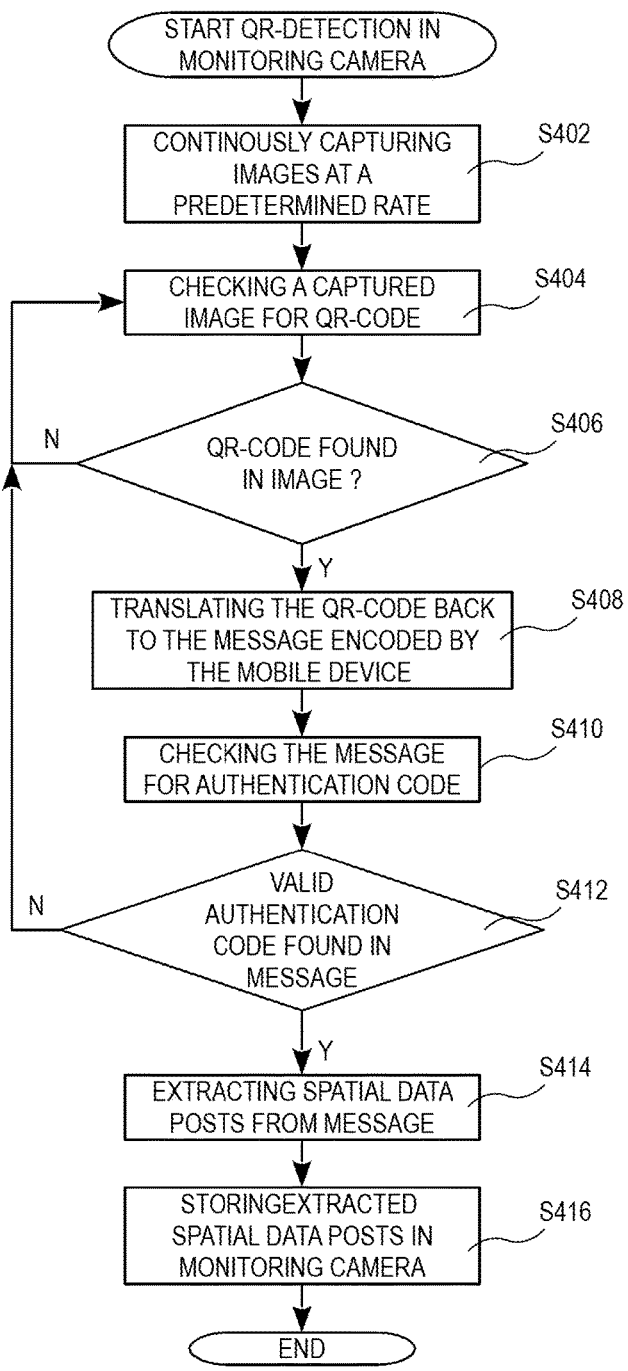
FIG. 4 is a flowchart depicting a process performed by the monitoring camera according to one embodiment.

Now referring to FIG. 4, the monitoring camera 14 is continuously capturing images at a predetermined rate as part of its operation as a monitoring camera, step 402. The presently captured image is then checked for a QR-code 22, S404. If no QR-code 22 is found, S406, then the process returns to S404, and a later captured image will be checked for a QR-code 22. This is repeated until a QR-code 22 is found in a captured image. Each consecutively captured image is not necessarily checked for a QR-code 22. When a QR-code 22 is found, the QR-code 22 is translated or decoded, S408, to a form that may be processed by the monitoring camera 14. The resulting message is then checked for a valid authentication code, S410. If no valid authentication code is found, S412, then the process returns to S404 where it checks a new image for a QR-code 22. However, if the authentication code is valid, then the message includes authorised sensor data and this sensor data is extracted, S414. The extracted sensor data post is then stored in monitoring camera 14, S416, either to be used as is or for further refinement by combining the sensor data with data resulting from analysis of the captured image of the QR-code 22 in combination with the display specific spatial information included in the QR-code 22. Then the process is ended with the monitoring camera 14 having stored information of its general positioning, e.g., geographic coordinates, horizontal direction, vertical direction, and/or roll direction.

Figure 5:
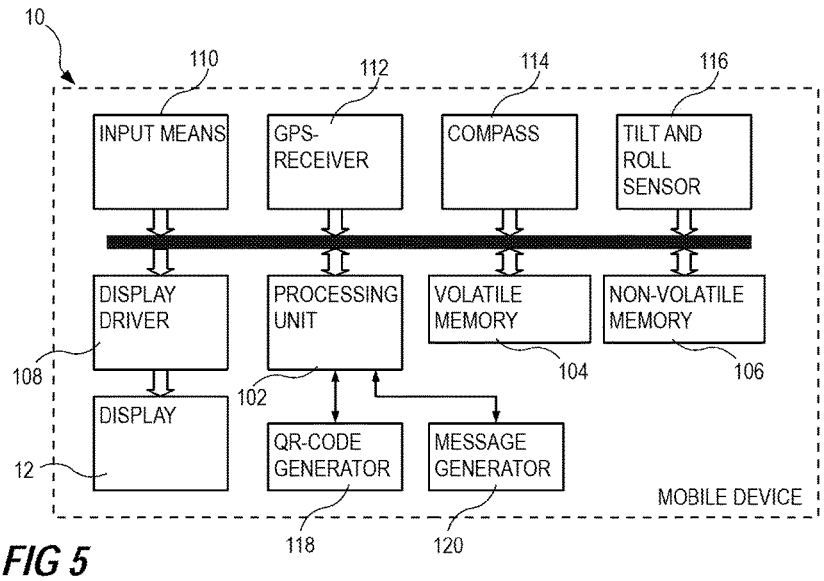
FIG. 5 is a schematic block diagram over a mobile device according to one embodiment.

One embodiment of the mobile device 10 enabled to perform the inventive process will now be described with reference to FIG. 5. The mobile device includes a display 12, a processing unit 102 arranged to execute code that is defining functions of the mobile device 10, a volatile memory 104, a non-volatile memory 106, a display driver 108 interfacing the display 12 with the rest of the mobile device 10 in order to present information of the mobile device 10 on the display 12, an input 110 for manual input of data into the mobile device, a GPS-receiver 112 for acquiring the geographical position of the mobile device by accessing some geo positioning service, a compass 114 for providing the direction in which the mobile device 10 is facing, and a tilt and roll sensor 116, which may be one single sensor but could alternatively be two separate sensors. Further, the mobile device 10 according to this embodiment includes a QR-code generator 118 implemented as a program module to be executed by the processing unit 102 and a message generator 120 also implemented as a program module to be executed by the processing unit 102.

The tilt and roll sensor 116 may be a module including a plurality of accelerometers arranged to detect at least these angles or directions. However, the tilt and roll sensor 116 could also be two tilt sensors, e.g., one for front to back tilting, i.e. tilt, and one for side to side tilting, e.g., roll.

Figure 6:
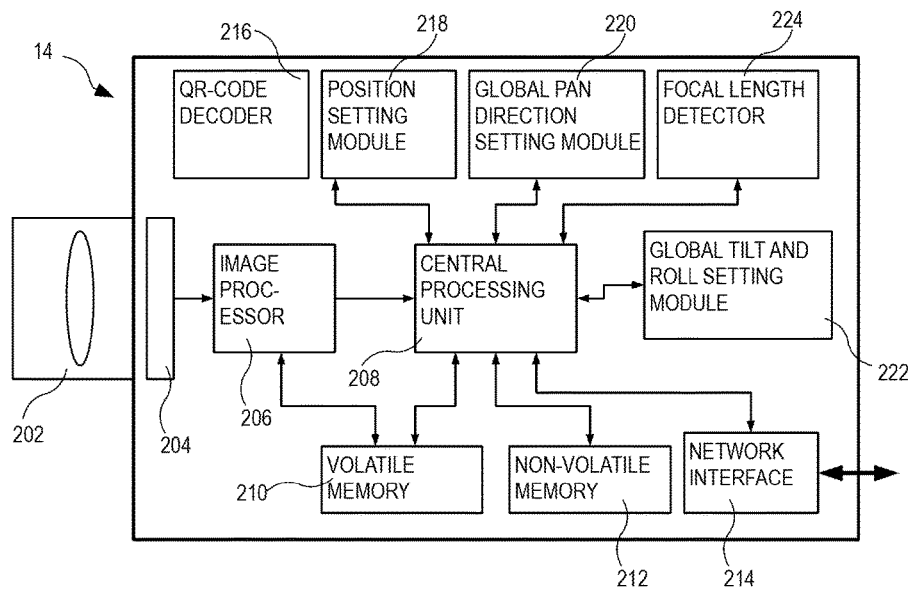
FIG. 6 is a schematic block diagram over a monitoring camera according to one embodiment.

One embodiment of the monitoring camera 14 enabled to perform the inventive process will now be described with reference to FIG. 6. The monitoring camera 14 may be any ordinary monitoring and/or surveillance camera. This may be advantageously applied to stationary cameras monitoring or surveying a predetermined area. Hence, the monitoring camera 14 includes features of a normal monitoring camera, e.g., lens 202, image sensor 204, image processor 206, central processing unit 208, volatile memory 210, and non-volatile memory 212. Additionally, the monitoring camera 14 may be a networked monitoring camera and in such case the monitoring camera 14 includes a physical and logical network interface 214. Moreover, the monitoring camera 14 of an embodiment includes a QR-code decoder 216, a position setting module 218, a global pan direction setting module 220, and a global tilt and roll setting module 222.

The QR-code decoder 216 is arranged to process the graphics representing the QR-code and re-create the message encoded into the QR-code 22 at the mobile device 10, this processing is performed by algorithms known to the person skilled in the art. In applications in which another graphical representation is used the decoder is adapted to these graphical representations instead. For example, if the code is plain text presented on the display of the mobile device, then an Optical Character Recognition (OCR) based decoder is implemented instead, and if the code is a barcode, a barcode decoder is implemented instead.

The position setting module 218 is arranged to store the position in the monitoring camera 14 for later use and/or for sending to a central server. In case the monitoring camera 14 increases the accuracy of the position by considering additional data calculated from the display specific spatial information included in the QR-code 22 and features measured in the captured image of the QR-code 22, these increased accuracy calculations may also be performed in the position module 218.

The global pan direction setting module 220 is arranged to store the compass direction representing the viewing direction of the monitoring camera 14 in the monitoring camera 14 for later use and/or for sending to a central server. In case the monitoring camera 14 increases the accuracy of the pan direction by considering additional data calculated from the display specific spatial information included in the QR-code 22 and features measured in the captured image of the QR-code 22, these increased accuracy calculations may also be performed in the global pan direction setting module 220.

The global tilt and roll setting module 222 is arranged to store the value representing the tilt of the camera and a value representing the roll of the monitoring camera 14 in the monitoring camera 14 for later use and/or for sending to a central server. In case the monitoring camera 14 increases the accuracy of the roll and/or tilt by considering additional data calculated from the display specific spatial information included in the QR-code 22 and features measured in the captured image of the QR-code 22, these increased accuracy calculations may also be performed in the global tilt and roll setting module 222.

The monitoring camera may also include a focal length detector 224, which is arranged to provide data relating to the present focal length of the optical system 202 of the monitoring camera 14. The focal length detector 224 may be implemented as a position signal from a step motor or any other control system controlling a zoom function of the camera or it may be an implementation of an image analysing method running on a processing unit of the monitoring camera analysing image data captured. Moreover, in systems where the focal length is not possible to alter, the focal length value may be stored in the monitoring camera for use in calculations.

The detection of if a QR-code is present in the captured image or not may be performed in the image processor 206. Processes described in previous flowcharts and other functions of the mobile device 10 or the monitoring camera 14 may be implemented as program code executed in processing units of the respective device, e.g., the processing unit 102 of the mobile device 10 and the central processing unit 208 of the monitoring camera 14, or these processes or functions may be implemented using logic circuitry.

According to one embodiment the monitoring camera 14 is connected to a network including a central server 20 to which any position and direction data acquired as described above may be sent for further use or processing. Such networked system may include additional monitoring cameras 16 also implementing the methods recited in the disclosure. The data relating to the position and the direction of the camera may be used to draw a representation of the specific monitoring camera at an accurate position on a plan and direct the camera and an indication of the camera view in the direction it is mounted.

As mentioned above more precise determinations of the position and direction of the camera may be calculated based on the position and direction of the mobile device, using information on the size and shape of the QR code or other pattern displayed on the mobile device. For instance, a homography describing the relationship between 3D coordinates in the real world and 3D coordinates of the camera may be used.

If the geographical coordinates of the mobile device have been determined and are available by capturing the QR code, and information on the size and shape of the QR code are also included in the QR code, the relationship between the position and orientation of the mobile device and the camera may be determined. Hence, the camera position may be determined more accurately by using principles of a per se known camera calibration procedure in order to determine the differences in position and direction between the camera and the mobile device and by using these differences to determine the position and direction of the camera from the position and direction of the mobile device.

Given the information on the size and shape of the QR code, positions of points of the QR code (e.g., the corners or the position indicators) are known in a coordinate system of the QR code itself. By matching points in the image of the QR code with corresponding points in the QR code displayed on the mobile device, coordinate pairs are obtained. The relationship between the coordinates in such a pair may be expressed with the following formula:

$$(x_i, y_i) \rightarrow (X_i, Y_i, Z_i),$$

where $(x_i, y_i)$ denotes the 2D coordinates in the image, and $(X_i, Y_i, Z_i)$ denotes the 3D coordinates in the real world.

Figure 7:
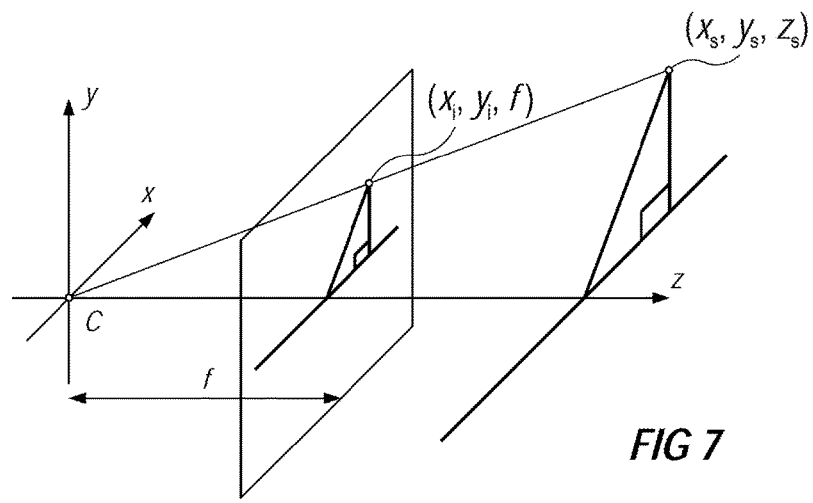
FIG. 7 illustrates a linear transformation between real world points and image points.

Real world points, e.g., points in the displayed QR code, and image points, e.g., points in the QR code as captured by the camera, may be represented by homogeneous vectors. With reference to FIG. 7, central projection thereof is a linear transformation, which may be expressed as follows:

$$x_i = f \frac{x_s}{z_s},$$
$$y_i = f \frac{y_s}{z_s},$$

where f is the focal length of the camera, $(x_i, y_i, f)$ denotes the 3D coordinates of a point in the image, and $(x_s, y_s, z_s)$ denotes the 3D coordinates of the corresponding point in the scene.

$$\begin{bmatrix} u \\ v \\ w \end{bmatrix} = \begin{bmatrix} f & 0 & 0 & 0 \\ 0 & f & 0 & 0 \\ 0 & 0 & 1 & 0 \end{bmatrix} \begin{bmatrix} x_s \\ y_s \\ z_s \\ 1 \end{bmatrix},$$

$$x_i = \frac{u}{w},$$

$$y_i = \frac{v}{w}.$$

The calculations presented here may be performed without prior knowledge of the present focal length, but the calculations will become faster if the focal length is already known. Some examples of methods for acquiring the present focal length will be given later in this description.

A transformation may be made from lengths to pixels using the image center, denoted $(x_0, y_0)$, and scaling factors for scaling from length to pixels, denoted $k_x$ and $k_y$. In the two following equations, $x_{pix}$ and $y_{pix}$ denote coordinates measured in pixels.

$$x_{pix} = k_x x_i + x_0 = fk_x \frac{x_s + z_s x_0}{z_s},$$

$$y_{pix} = k_y y_i + xy_0 = fk_y \frac{y_s + z_s y_0}{z_s}.$$

Similar to the equations above expressed in lengths, the following equations may be used expressed in pixels:

$$\begin{bmatrix} u' \\ v' \\ w' \end{bmatrix} = \begin{bmatrix} \alpha_x & 0 & x_0 & 0 \\ 0 & \alpha_y & y_0 & 0 \\ 0 & 0 & 1 & 0 \end{bmatrix} \begin{bmatrix} x_s \\ y_s \\ z_s \\ 1 \end{bmatrix},$$

where $\alpha_x = fk_x,$ $\alpha_y = fk_y,$ which may be regarded as the focal length given in pixels. The pixel coordinates may be expressed as follows:

$$x_{pix} = \frac{u'}{w'},$$

$$y_{pix} = \frac{v'}{w'}.$$

Adding a skew parameter S, a rearrangement may be made as follows:

$$\begin{bmatrix} \alpha_x & s & x_0 & 0 \\ 0 & \alpha_y & y_0 & 0 \\ 0 & 0 & 1 & 0 \end{bmatrix} = \begin{bmatrix} \alpha_x & s & x_0 \\ 0 & \alpha_y & y_0 \\ 0 & 0 & 1 \end{bmatrix} \begin{bmatrix} 1 & 0 & 0 & 0 \\ 0 & 1 & 0 & 0 \\ 0 & 0 & 1 & 0 \end{bmatrix} = K[I_3 \mid 0_3]$$

The 3×3 upper triangular matrix K is called the calibration matrix. The parameters in matrix K include intrinsic parameters of the camera and are an important input in the transformation operations.

Figure 8:
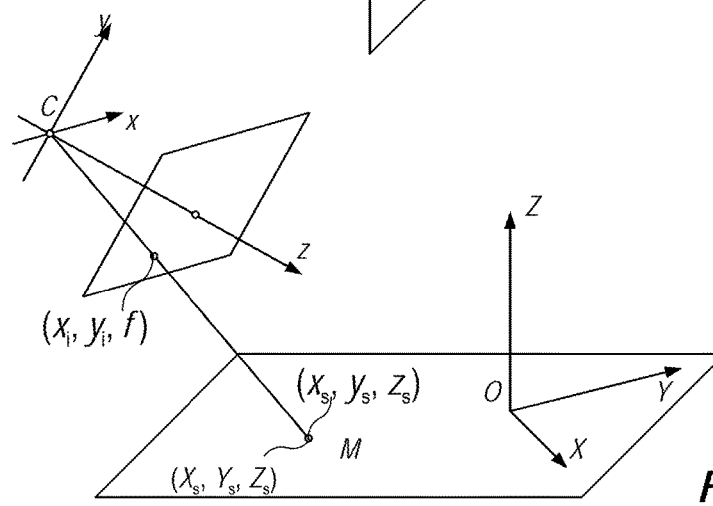
FIGS. 8 and 9 illustrate a relationship between scene points in an image coordinate system and scene points in a real world coordinate system.
Figure 9:
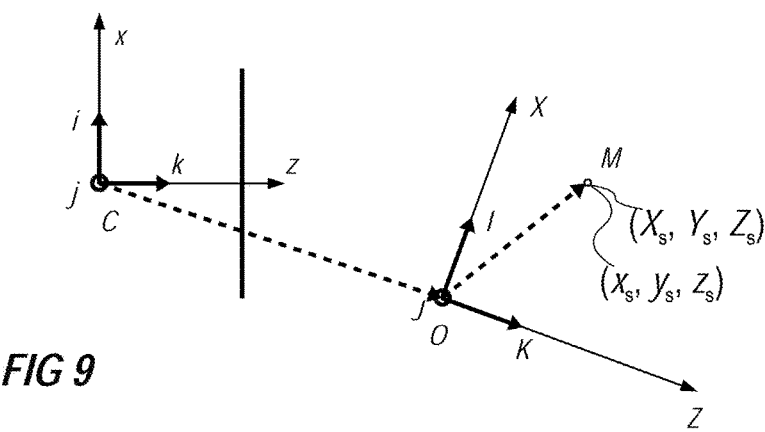

With reference to FIGS. 8 and 9, the relationship between scene points $(x_s, y_s, z_s)$ in the image coordinate system and scene points $(X_s, Y_s, Z_s)$ in the real world coordinate system may be obtained by adding the translation vector CO=T from the starting point of the image coordinate system to the starting point of the real world coordinate system to the vector describing a point M in the real world coordinate system.

$CM = CO + OM,$ $x_s i + y_s j + z_s k = T_x i + T_y j + T_z k + X_s I + Y_s J + Z_s K,$ $x_s = T_x + X_s I.i + Y_s J.i + Z_s K.i,$ $$\begin{bmatrix} x_s \\ y_s \\ z_s \end{bmatrix} = \begin{bmatrix} T_x \\ T_y \\ T_z \end{bmatrix} + \begin{bmatrix} I.i & J.i & K.i \\ I.j & J.j & K.j \\ I.k & J.k & K.k \end{bmatrix} \begin{bmatrix} X_s \\ Y_s \\ Z_s \end{bmatrix}.$$

Using homogeneous coordinates, this may be written as follows:

$$\begin{bmatrix} x_s \\ y_s \\ z_s \\ 1 \end{bmatrix} = \begin{bmatrix} I.i & J.i & K.i & T_x \\ I.j & J.j & K.j & T_y \\ I.k & J.k & K.k & T_z \\ 0 & 0 & 0 & 1 \end{bmatrix} \begin{bmatrix} X_s \\ Y_s \\ Z_s \\ 1 \end{bmatrix},$$

$$\begin{bmatrix} x_s \\ y_s \\ z_s \\ 1 \end{bmatrix} = \begin{bmatrix} R & T \\ 0_3^T & 1 \end{bmatrix} \begin{bmatrix} X_s \\ Y_s \\ Z_s \\ 1 \end{bmatrix}.$$

This may alternatively be expressed as $CM = OM - OC,$ $x_s i + y_s j + z_s k = (X_s - X_C) I + (Y_s - Y_{SC}) J + (Z_s - Z_C) K,$ $x_s = (X_s - X_C) I.i + (Y_s - Y_C) J.i + (Z_s - Z_C) K.i,$ $x_{cam} = R(X - \tilde{C}).$ $\tilde{C}$ is the vector OC expressed in world coordinates. Using $-R\tilde{C}$ instead of T, the following equation may be set up:

$$\begin{bmatrix} x_s \\ y_s \\ z_s \\ 1 \end{bmatrix} = \begin{bmatrix} R & -R\tilde{C} \\ 0_3^T & 1 \end{bmatrix} \begin{bmatrix} X_s \\ Y_s \\ Z_s \\ 1 \end{bmatrix}.$$

The camera projection matrix and the coordinate transformation matrix may be combined into one matrix P.

$$\begin{bmatrix} u' \\ v' \\ w' \end{bmatrix} = K[I_3 \mid 0_3] \begin{bmatrix} x_s \\ y_s \\ z_s \\ 1 \end{bmatrix} \text{ and } \begin{bmatrix} x_s \\ y_s \\ z_s \\ 1 \end{bmatrix} = \begin{bmatrix} R & -R\tilde{C} \\ 0_3^T & 1 \end{bmatrix} \begin{bmatrix} X_s \\ Y_s \\ Z_s \\ 1 \end{bmatrix}$$

give $$\begin{bmatrix} u' \\ v' \\ w' \end{bmatrix} = K[I_3 \mid 0_3] \begin{bmatrix} R & -R\tilde{C} \\ 0_3^T & 1 \end{bmatrix} \begin{bmatrix} X_s \\ Y_s \\ Z_s \\ 1 \end{bmatrix},$$

which may be expressed as $$\begin{bmatrix} u' \\ v' \\ w' \end{bmatrix} = P \begin{bmatrix} X_s \\ Y_s \\ Z_s \\ 1 \end{bmatrix},$$

or $$x = PX$$

This may be simplified as follows:

$$x = K[I_3 \mid 0_3] \begin{bmatrix} R & -R\tilde{C} \\ 0_3^T & 1 \end{bmatrix} X,$$

$$[I_3 \mid 0_3] \begin{bmatrix} R & -R\tilde{C} \\ 0_3^T & 1 \end{bmatrix} = [R \ -R\tilde{C}] = R[I_3 \mid -\tilde{C}],$$

$$x = KR[I_3 \mid -\tilde{C}]X,$$

$$P = KR[I_3 \mid -\tilde{C}].$$

This matrix P has eleven degrees of freedom, whereof five are from the triangular calibration matrix K, three are from R, and three are from $\tilde{C}$. It may be noted that P is a 3×4 matrix, and that the left 3×3 submatrix KR is non-singular. P may be estimated using points in the scene and corresponding points in the image. If the calibration matrix K is already known, this estimation is simplified significantly. However, using a sufficient number of pairs of points, P may be estimated even if the calibration matrix is not yet known.

In order to determine the camera translation, the homogeneous coordinates of C in the scene should be found. C is the null vector of the matrix P. Thus:

$$PC = 0,$$

$$P = KR[I_3 \mid -\tilde{C}],$$

$$\begin{bmatrix} 1 & 0 & 0 & X_C \\ 0 & 1 & 0 & Y_C \\ 0 & 0 & 1 & Z_C \end{bmatrix} \begin{bmatrix} X_C \\ Y_C \\ Z_C \\ 1 \end{bmatrix} = \begin{bmatrix} 0 \\ 0 \\ 0 \\ 0 \end{bmatrix}.$$

The null vector C of P may be found using singular value decomposition.

Further, the camera orientation and the intrinsic parameters may be found. Here, it may be noted that the left 3×3 submatrix M of P is of the form M=KR. K is an upper triangular matrix, and R is an orthogonal matrix. A non-singular matrix M may be decomposed into a product of K and R using RQ factorization. As already noted, if the calibration matrix K is already known, i.e. the camera is calibrated, the calculations are simplified.

The matrix P may be computed by taking 3D points $X_i$ in the world coordinates system and corresponding images $x_i$ of $X_i$ in the image, and writing $x_i = PX_i$ for all i. This matrix P may then be used for calculating the position and orientation of the camera based on the position of the mobile device as stated in the QR code displayed on the mobile device adjusted by parameters calculated from the P matrix. The position of the camera in relation to the QR-code in real world coordinates, i.e. coordinates relating to the three dimensional world outside the image plane captured by the camera, is provided in matrix C and the orientation of the camera in relation to the three axes of the real world coordinate system, i.e. the rotation of the camera in view of these axes, is provided in matrix R.

Such calculations may be performed using software code available, e.g., in OpenCV or Camera Calibration Toolbox for Matlab.

Figure 10:
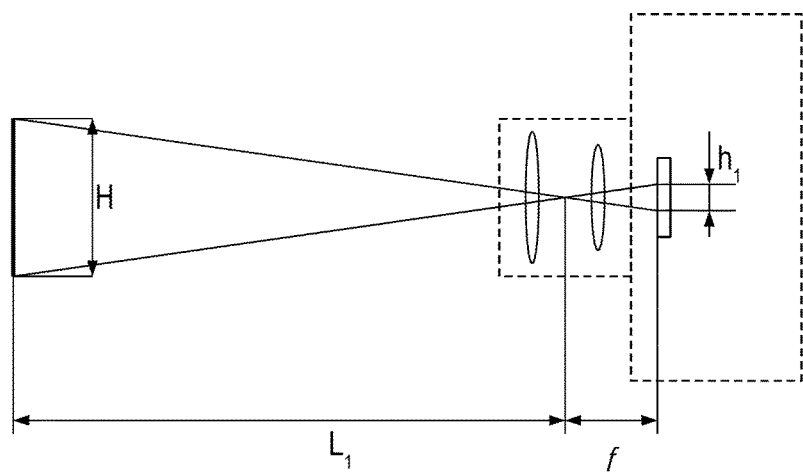
FIG. 10 illustrates one example of a method for identifying the focal length of a lens in use.

The focal length of the system, i.e. the lens, may be extracted from the P matrix above. However, in order to speed up calculations and make the solving of the matrixes above require less processing power the focal length may be provided beforehand. In these cases the focal length may be preset, e.g., in a system with fixed focal length lens, or it may be typed in. Alternatively, the monitoring camera may use an automatic focal length determining method. There are plenty of methods designed for identifying the focal length of a lens in use. One example of such method utilizes the approximation presented in the equation below, referring to FIG. 10:

$$h_1 = f \frac{H}{L_1}$$

Figure 11:
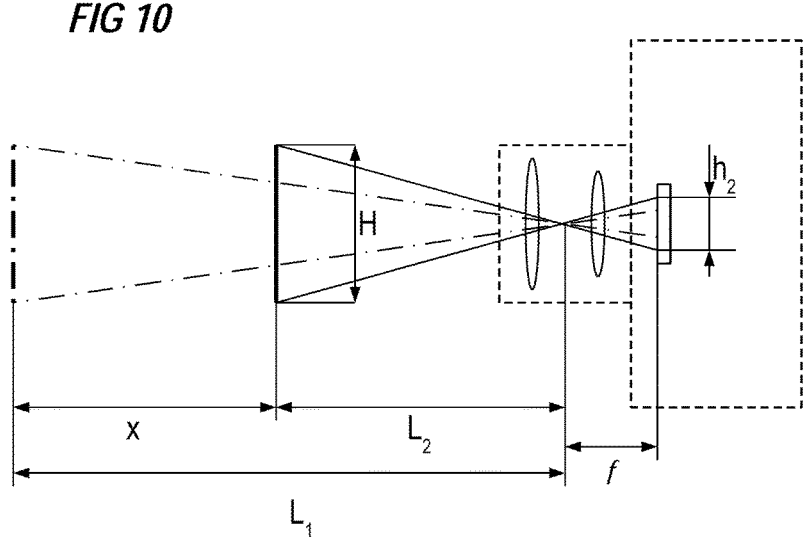
FIG. 11 illustrates a method for calculating a focal length.

In the equation, $h_1$ is the captured height of an object having the height H, e.g., the distance LQ of the graphical code in FIG. 2 or the height of the entire mobile device. $L_1$ is the distance from the camera to the object and f is the focal length of the lens in use. The focal length f may be calculated if the height $h_1$ of the object as captured on the image sensor is determined by the camera at a first distance $L_1$ from the camera and then the height $h_2$ of the object as captured on the image sensor is determined by the camera at a second distance $L_2$, see FIG. 11.

$$h_2 = f \frac{H}{L_2}$$

In order to achieve this, the distance moved between the two captures of the images of the object is measured or estimated, referred to as d below.

$$d = L_1 - L_2$$

The real height of the object is the same independent of positions, which results in the following:

$$f = \frac{h_1}{H} L_1 = \frac{h_2}{H} L_2$$

and $$h_1 L_1 = h_2 L_2 = h_2(L_1 - d)$$

Then $$L_1 = \frac{h_2 d}{(h_2 - h_1)}$$

Which results in the equation of the focal length below:

$$f = \frac{h_1 h_2 d}{H(h_2 - h_1)}$$

Hence, by capturing two images of the graphical code at a predetermined distance between the graphical code at the two different capturing moments, the camera is able to calculate the focal length.

In other embodiments the position of the monitoring camera 14 may be determined by holding the mobile device in contact with the monitoring camera 14. The mobile device 10 may be held onto the front of the lens in order to have the mobile device 10 be positioned substantially at the same geographic position as the monitoring camera 14 and if the back or front of the mobile device 10 is held flush with the outer rim of the lens of the monitoring camera 14 then the direction of the mobile device 10 and the direction of the mobile device will substantially correspond. Moreover, in order to make the angle of roll of the monitoring camera 14 substantially correspond to the angle of roll of the mobile device 10 the user holding the mobile device 10 may change the angle of roll of the mobile device 10 until a substantially rectilinear edge of the mobile phone visually aligns with a substantially rectilinear feature of the monitoring camera 14, e.g., the user may aim to hold the upper edge of the mobile device parallel to the upper edge or surface of the monitoring camera 14. When the mobile device 10 is held in place like described above the user triggers a process for at least temporarily storing any one of or any combination of the geographic position, the direction, and the angle of roll detected by the mobile device 10. This storing process may be triggered by the user pushing a button on the mobile device 10 or any other possible triggering action. The mobile device 10 generates a graphical code 22 for display on the display 12 of the mobile device, as described above. The graphical code 22 includes at least some of the stored data, e.g., geographic position, direction, and/or angle of roll. As described earlier in this specification the graphical code may be a QR-code. The mobile device 10 is moved to a distance from the lens of the monitoring camera 14 where the display of the mobile device 10 may be captured by the monitoring camera 14 itself. Then the monitoring camera may decode the graphical code and determine its geographical position, its viewing direction, and/or its angle of roll, depending on which features are encoded into the graphical code.

The angle of roll may be dynamic in this setup, i.e. it will not be locked to the value captured when the mobile device 10 is triggered for storing of the rest of the positional data. Then the monitoring camera 14 may operate on the angle of roll data as described previously where the angle of roll data and thus the QR-code is frequently updated.

In other embodiments the processes above may be used in order to help a person installing or servicing a monitoring camera 14 to get the horizon level in the captured image. The mobile device 10 is held in front of the camera as described in any embodiment above. The graphical code presented on the display 12 of the mobile device is frequently updated with at least the information relating to angle of roll of the mobile device 10. The camera calculates the angle of roll of itself based on the captured image of the graphical code and decoded information carried by the graphical code, i.e. the monitoring camera calculates its angle of roll based on the image captured and the information provided from the mobile device 10. The resulting angle of roll of the monitoring camera is then evaluated, e.g., by the monitoring camera itself or by a computational device in a network connected to the camera, and a sound or a light generated by the monitoring camera 14 is controlled in order to indicate whether the angle of roll is acceptable or not. The sound or light may either be generated to indicate that the angle of roll is acceptable or that it is not acceptable.

In order to facilitate understanding of such an implementation an example will be presented. The mobile device is held in front of the monitoring camera 14 showing the graphical code so that it may be captured by the camera. If the camera is angled around the optical axis of the monitoring camera and in relation to the horizon a light emitting diode (LED) is activated to emit light. The person installing or servicing the camera may then turn the camera around the optical axis until the LED stops emitting light, indicating that the angle of roll is acceptable.

If high accuracy is desired when determining the position of the camera, the QR-code or other pattern displayed on the mobile device needs to be updated when the mobile device is moved around in front of the camera. However, this introduces a risk of capturing incomplete or broken QR-codes, since the frame rate at which the camera captures images is not necessarily synchronized with the update frequency of the display of the mobile device. Images captured at the time of updating the display of the mobile device may contain a mix of an old QR-code and a new QR-code. In order to reduce the problem of capturing incomplete QR-codes, the update frequency of the display of the mobile device may be reduced, such that the pattern on the display is updated fewer times per second than the frame rate of the camera. For instance, the display may be updated at intervals corresponding to two or three frames captured by the camera. Still, this would add latency that would reduce the accuracy of the determination of the camera position, and it would also imply processing unnecessary duplicates of QR-code images.

Instead, the risk of capturing incomplete QR-codes may be reduced by taking advantage of the different color channels of the camera and the display. When the QR-code is to be updated, it is first updated only on the green color channel, while the red and blue color channels still show the previous QR-code. Next time the QR-code is to be updated, the red and blue color channels are updated, while the green color channel displays the same QR-code as before. Thus, the display will be displaying two QR-codes simultaneously with one or two color channels displaying the QR-code corresponding to the latest determined position of the mobile device, and the other one or two color channels displaying the QR-code corresponding to the previously determined position of the mobile device. It would also be possible to perform the updating as a three-step process, first updating one of the color channels (e.g., red), then another color channel (e.g., green) and finally the last color channel (e.g., blue). Translation of the QR-code into a geographical position is done in the camera one, or when applicable two, color channel at a time. Should one the color channels of the captured image contain an incomplete or mixed QR-code, the other color channel or color channels may still be used for determining the position of the camera. Advantageously, the QR-code need only be located once in each image captured by the camera, and then decoded or translated into a position twice (or three times depending on the number of color channels into which the updating is split), i.e. once per applicable color channel.

The skilled person will realize that such an update approach is not limited to QR-codes, but may be used with all sorts of patterns as discussed earlier. This approach is also not limited to an RGB (red, green, blue) color space, but may be used with any color space used by the combination of mobile device display and camera at hand.

What is claimed is:

1. A method for determining a geographical position of a camera, the method comprising:
   determining, in a mobile device, geographical coordinates of the mobile device using a global positioning system (GPS) receiver and registering the geographical coordinates within the mobile device;
   determining, in the mobile device, a geographical direction in which the mobile device is directed, wherein the mobile device is directed at the camera;
   generating, in the mobile device, a pattern that includes information representing the geographical coordinates of the mobile device and the geographical direction in which the mobile device is directed;
   dynamically adjusting the pattern in response to a change in the geographical direction in which the mobile device is directed, wherein the pattern is adjusted without additional user intervention;
   presenting, on a display of the mobile device, the pattern;
   capturing, by the camera, an image of the display of the mobile device when presenting the pattern;
   translating, in the camera, the pattern in the captured image of the display of the mobile device into geographical coordinates and a geographic direction; and
   determining, in the camera, the geographical position of the camera based on the geographical coordinates and the geographical direction translated from the pattern in the captured image.

2. The method according to claim 1, wherein the pattern includes information identifying a distance between two distinguishable features of the pattern presented on the display of the mobile device.

3. The method according to claim 1, wherein the pattern is a two dimensional code and wherein the pattern is representing said data that is to be represented by a pattern on the display of the mobile device.

4. The method according to claim 1, wherein the pattern is a QR-code.

5. The method according to claim 1, further comprising:
   wherein the determining the geographical position of the camera includes calculating the position of the camera by adjusting the position retrieved from the pattern presented by the mobile device based at least on physical features of the pattern which are measured in the captured image and on the value identifying the distance between two distinguishable features in the pattern of the captured image.

6. The method according to claim 1, wherein the determining the position of the camera includes determining the position of the camera as the position presented by the mobile device.

7. The method according to claim 1, further comprising storing the position of the camera in the camera.

8. The method according to claim 1, further comprising storing the position of the camera in a camera managing server.

9. A system for determining a geographical position of a camera, the system comprising:
   the camera; and
   a mobile device, wherein the mobile device comprises:
   a global positioning system (GPS) receiver configured to determine geographical coordinates of the mobile device;
   a processing unit configured to detect a geographical direction in which the mobile device is directed, wherein the mobile device is directed at the camera;
   the processing unit further configured to generate a pattern that includes information representing the geographical coordinates of the mobile device and the geographical direction in which the mobile device is directed;
   the processing unit in the camera is further configured to dynamically adjust the pattern in response to a change in the geographical direction in which the mobile device is directed without additional user intervention; and
   a display arranged to visually present said pattern;
   wherein the camera comprises:
   an image sensor for capturing images of said pattern; and
   a processing unit configured to:
   interpret the information in the pattern generated by the processing unit of the mobile device and captured by the image sensor;
   extract the geographical position information, including geographical coordinates and a geographic direction, from the interpretation by the pattern interpreter; and
   set the geographical position of the camera based on the extracted geographic position information.

10. The system according to claim 9, wherein the generated pattern includes information identifying a distance between two distinguishable features of the pattern presented on the display of the mobile device.

11. The system according to claim 9, wherein the mobile device is a smart phone or a tablet computer.

12. The system according to claim 9, wherein the processing unit in the camera is further configured to set the geographical position of the camera by calculating the position of the camera by adjusting the position retrieved from the pattern presented by the mobile device based at least on physical features of the pattern which are measured in the captured image and on information identifying the distance between two distinguishable features in the pattern of the captured image.

13. The system according to claim 9, wherein the processing unit in the camera is further configured to set the position of the camera to the same position as the position presented in the pattern displayed by the mobile device.

* * * * *